Figure 1:
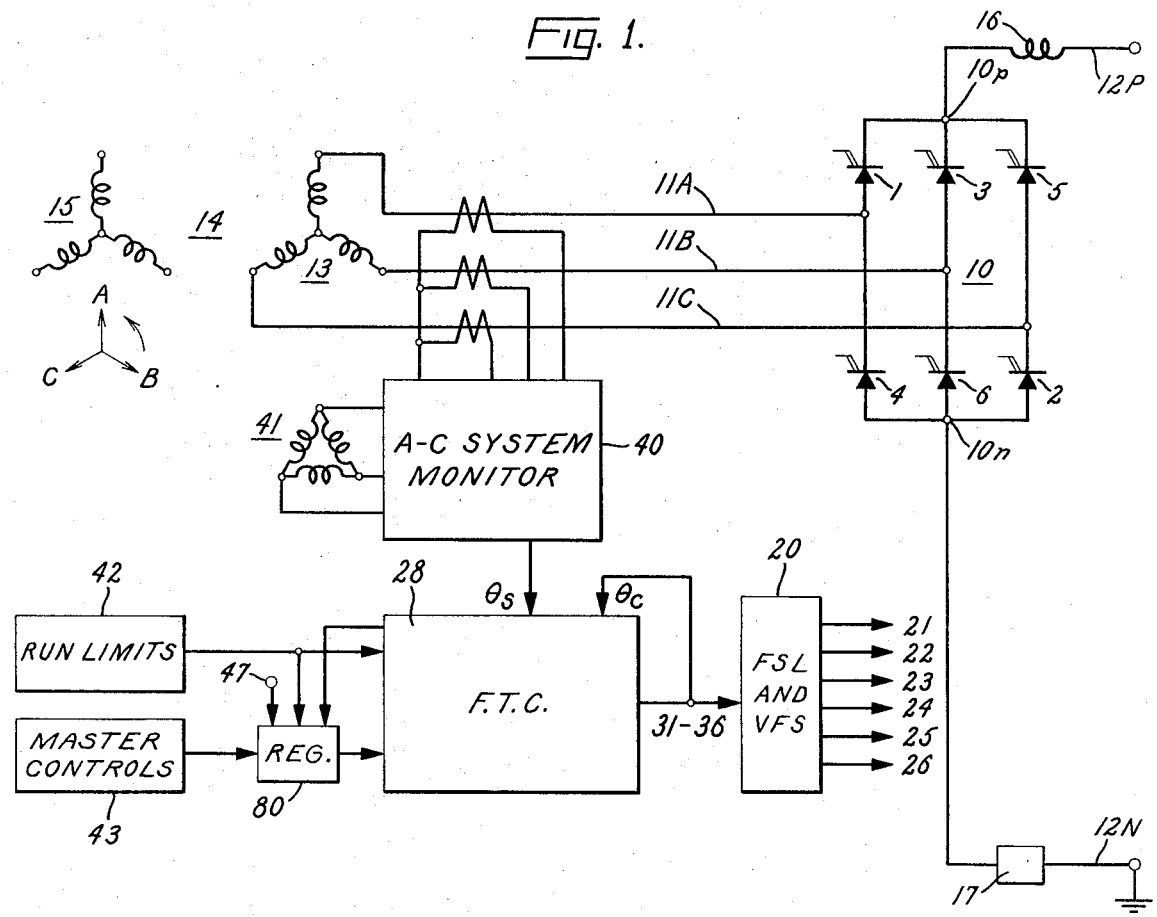

United States Patent [19]
Pollard

[11] 3,863,133
[45] Jan. 28, 1975

[54] MEANS FOR MONITORING THE RELATIVE PHASE RELATIONSHIP BETWEEN TWO VARIABLE-FREQUENCY PERIODIC SIGNALS

[75] Inventor: Ernest M. Pollard, Cherry Hill, N.J.
[73] Assignee: General Electric Company, Philadelphia, Pa.
[22] Filed: July 23, 1973
[21] Appl. No.: 382,016

[52] U.S. Cl. ........................................ 321/5, 321/40
[51] Int. Cl. ............................................. H02m 7/20
[58] Field of Search......... 321/5, 16, 18, 27 R, 69 R, 321/38, 40

[56] References Cited
UNITED STATES PATENTS

| 2,832,029 | 4/1958 | Forssell | 321/16 X |
| 3,551,778 | 12/1970 | Ekstrom | 321/18 X |
| 3,701,938 | 10/1972 | Chadwick | 321/5 X |
| 3,737,763 | 6/1973 | Chadwick | 321/5 X |
| 3,771,041 | 11/1973 | Chadwick | 321/5 |

Primary Examiner—R. N. Envall, Jr.
Attorney, Agent, or Firm—Albert S. Richardson, Jr.; J. Wesley Haubner

[57] ABSTRACT

Improved means is provided for monitoring the electrical angle "beta" between a cyclic reference signal of variable frequency and a periodic output signal whose frequency varies with that of a voltage-controlled oscillator. The beta monitor comprises means for deriving a frequency error signal which depends on the magnitude difference between a voltage that determines the frequency of the oscillator and a frequency feedback voltage whose magnitude is porportional to the frequency of the reference signal and is equal to the magnitude of the frequency determining voltage so long as both the reference signal and the output signal have the same frequency, and means for integrating the frequency error signal to produce an angle feedback signal which is the time integral of the frequency error. The angle feedback signal thus predicts any changes in beta caused by variations in the frequency of either the reference signal or the oscillator, and its steady-state accuracy is improved by modifying the frequency error signal as a function of any angle error signal obtained by comparing the magnitude of the angle feedback signal with the magnitude of an additional angle feedback signal which is derived by means for detecting and for averaging the actual phase relationship between the reference and output signals.

13 Claims, 2 Drawing Figures

MEANS FOR MONITORING THE RELATIVE PHASE RELATIONSHIP BETWEEN TWO VARIABLE-FREQUENCY PERIODIC SIGNALS

This invention relates to means for measuring the angular displacement between two cyclic quantities which have a variable phase relationship with respect to one another, and more particularly it relates to means for monitoring the firing angle at which electric valves are fired in a static converter of the kind that can be operated alternatively in either a rectifying mode (converting a-c to d-c) or an inverting mode (converting d-c to a-c) in an HVDC electric power delivery system.

A static power converter suitable for HVDC power delivery systems comprises the combination of a polyphase power transformer and at least one group of six interconnected current conducting valves. Each of the valves can be a single mercury arc tube, or a plurality of semiconductor cells such as thyristors that are operated in unison. Typically the valves are arranged in 3-phase double-way 6-pulse bridge configurations having three separate a-c terminals and a pair of positive and negative d-c terminals. By sequentially firing the respective valves in the proper order and in synchronism with the sinusoidal alternating voltage of the 3-phase electric power system to which the a-c terminals of the bridge are connected, the flow of power between the a-c and d-c terminals can be controlled as desired.

The time at which a valve is fired, measured in electrical degrees from a recurrent reference point in each cycle of the associated voltage, is known as the "firing angle." It can be expressed either as an angle of delay ("alpha") after the positive-going zero crossing of the anode voltage of the valve, or as the complementary angle of advance ("beta") prior to the cyclically recurring instant at which the anode voltage waveform would have crossed zero and gone negative relative to the cathode if the valve had not been fired. Hereinafter the firing angle will be referenced to the latter instance, it being understood that a beta of $\beta$ degrees corresponds to a delay angle of $180° - \beta$. When beta approaches 180 degrees, alpha approaches zero and the average magnitude of the rectified voltage between the d-c terminals of the converter has a high positive level. As beta is decreased from 180° to approximately 90°, the average d-c voltage decreases to zero. For betas in the range of 90° to zero, the average d-c voltage reverses polarity (i.e., the potential on the nominal positive terminal is relatively negative), and the bridge operates in its inverting mode. Beta can be thought of as a measure of the angular displacement between a rotating phasor that characterizes the cyclic firings of the converter valves and another rotating phasor that characterizes the alternations of the a-c system voltage. The time when a valve firing phasor traverses its reference position each cycle marks the beginning of a current conducting interval. When beta is close to 180°, the converter valve firing (and hence current) is nearly in phase with the alternating voltage of the system, there is positive voltage of maximum magnitude on the d-c terminals, and the converter is able to deliver maximum power from the a-c system to a load on its d-c side. If beta is close to zero, the valve firing phasor lags the system voltage phasor by nearly 180°, there is maximum negative voltage on the d-c terminals, and maximum power can be transmitted from a source on the d-c side of the converter to the a-c system. At some value of beta in between 0° and 180°, the two phasors are approximately 90° out-of-phase with respect to each other and no real power is transferred.

To fire an individual valve, its control grid or gate has to be activated by an appropriate trigger signal or gate pulse which is periodically applied thereto. A converter will therefore include suitable means for cyclically producing a series of gate pulses to fire the respective valves in the proper sequence and in synchronism with the alternating voltage of the power system. Ordinarily the control means comprises a firing signal generator whose operation determines the timing of the gate pulses and hence the firing angle of the valves. The firing signal generator performs the function of a firing time computer. In accordance with modern practice in the art, it will include a voltage-controlled oscillator which normally runs at an harmonic (e.g., 6 or 12) of the fundamental frequency of the alternating voltage power system to drive a distributor which in turn generates a family of equidistantly spaced firing signals for respectively initiating the aforesaid gate pulses. An improved form of such firing means is disclosed in my concurrently filed U.S. Pat. application Ser. No. 382015 assigned to the General Electric Co.

As is more fully described in my companion application Ser. No. 382015, the voltage-controlled oscillator of the firing signal generator is responsive to a frequency determining voltage which comprises the sum of a bipolar control signal whose magnitude is variable and a bias signal whose magnitude is selected so that during steady-state operation when the control signal is zero the oscillator runs in harmonic synchronism with the alternating voltage of the a-c system, in which event the frequency of the firing signals for each valve of the converter is the same as that of the system voltage and the angle ($\beta$) thereof is constant. A finite control signal of relatively positive or negative polarity will respectively increase or decrease the frequency determining voltage, whereby the firing signal frequency is proportionately raised or lowered relative to the system frequency and $\beta$ is respectively advanced or retarded at a rate of change that depends on the magnitude of the control signal. By transiently varying the control signal in accordance with the difference between actual and desired magnitudes of a selected quantity of the system or of the converter, the oscillator frequency will be momentarily changed as necessary to shift the firing angle to a value that results in equality between the response and the order, whereupon the control signal is reduced to zero and the frequency of the firing signals is again locked to the frequency of the alternating voltage.

The control means for firing the valves is also provided with appropriate firing angle limits so that $\beta$ cannot be shifted or varied outside of a certain range of permissible values. In accordance with the improvements claimed in my above-referenced companion application, the limits are advantageously introduced in the firing time computer by using an overriding clamp which is responsive to an angle feedback signal proportional to $\beta$ and which influences the control signal as a function of any deviation of this feedback signal above a preset maximum limit or below a preset minimum limit. In the preferred embodiment of that invention, the firing angle monitor that produces the angle feedback signal comprises the subject matter of the present application. To ensure that the firing angle is kept within its prescribed limits, such a monitor must have the ability to produce an angle feedback signal that accurately tracks the angular displacement between the system voltage phasor and the valve firing phasor during transient changes thereof. Thus both precision and speed of response are important criteria of the firing angle monitor.

Accordingly, a general objective of my present invention is to provide an improved firing angle monitor that exhibits high measurement accuracy whenever $\beta$ is constant yet quickly and accurately responds to changing values of $\beta$ caused by variations in the frequency of either the converter valve firings or the a-c system voltage.

It is a further object of the invention to provide, for accurately measuring the firing angle of a static power converter, a monitor which is characterized by both fast response to angle changes and relative immunity to system disturbances such as, for example, severe harmonic voltage distortion which can cause extra zero crossings of the alternating voltage waveform.

In carrying out the invention in one form, I provide a unique combination of a first fast-responding firing angle measuring circuit and a second slower but more precise firing angle measuring circuit. The first circuit is supplied with three inputs: a frequency feedback signal which is an analog representation of the actual fundamental frequency of the alternating voltage power system; a bias signal having a predetermined level which is equal to the magnitude of the frequency feedback signal whenever the fundamental system frequency is "normal" (e.g., 60 Hz); and a bipolar control signal of variable magnitude. The bias signal and the control signal are the same signals that are supplied to the voltage-controlled oscillator where their sum determines the frequency of valve firings in the static converter. (When the control signal is zero, the bias signal alone causes the valve firing frequency to equal the system frequency, and consequently the firing angle is then constant; when the control signal has a finite magnitude the valve firing frequency is proportionately increased or decreased, depending on the control signal polarity, and the firing angle consequently changes at a rate that depends on the control signal magnitude.)

The first firing angle measuring circuit includes means for deriving a frequency error signal which depends on the amount, if any, that the sum of the bias and control signals differs from the frequency feedback signal and which is therefore proportional to the difference between the valve firing frequency and the system frequency. This frequency error signal is integrated to give a first firing angle feedback signal the magnitude of which is a measure of the instantaneous angle between the rotating phasor that characterizes the converter valve firings and the rotating phasor that characterizes the system voltage. The integrating characteristic of this measuring circuit closely matches the integrating characteristic of the voltage-controlled oscillator, and the first feedback signal accurately tracks any changes in the phasor displacement angle caused by sudden variations of either the control signal or the system frequency. By continuously computing the angular displacement between the valve firing phasor and the system voltage phasor, the first measuring circuit produces an angle feedback signal whose magnitude, at any moment between two consecutive valve firings, represents the predicted value of the firing angle at the next firing if both the control signal and the system frequency were to remain unchanged after that particular moment. I have found that this measured value of the firing angle remains a true indication of the actual value (less than 3 percent error) even when the latter changes at a rate as high as 21.6° per millisecond in response to a step change of the control signal.

To correct for any offset instability or long-term drift of the integrator in the first measuring circuit, my firing angle monitor also includes a phase detector which is supplied with two inputs: a cyclic reference signal which is synchronized with the alternating voltage of the a-c system; and a periodic feedack signal which is indicative of the generation of a firing signal. The phase detector is suitably constructed and arranged to derive another firing angle feedback signal which is a measure of the average of the actual firing angles of the respective members of the family of firing signals that are generated over one full cycle of alternating voltage. This average firing angle feedback signal is compared with the first firing angle feedback signal, and the time integral of any error therebetween is fed back to the first measuring circuit where it is added to the other inputs of the first circuit so as to keep the steady state magnitude of the fast responding first angle feedback signal in agreement with the slower but more accurate average angle feedback signal.

Figure 2:
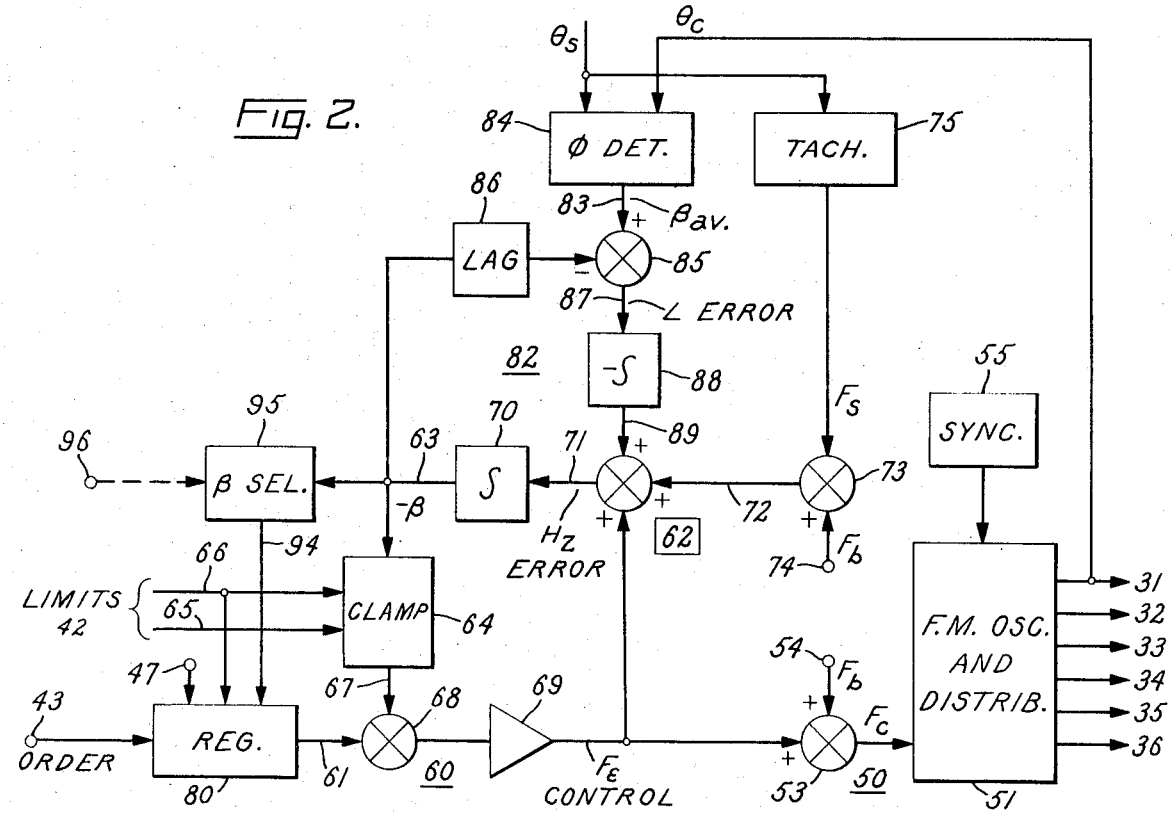

My invention will be better understood and its various objects and advantages will be more fully appreciated from the following description taken in conjunction with the accompanying drawing in which:

FIG. 1 is a functional block diagram of a static power converter the controls of which include a firing angle monitor that embodies my invention; and FIG. 2 is an expanded schematic diagram of the firing signal generator, and firing angle monitor comprising the firing time computer shown in block form in FIG. 1.

Referring now to FIG. 1, the illustrated converter is seen to comprise a group of six controllable electric valves 1, 2, 3, 4, 5, and 6 which are interconnected and arranged to form a 6-pulse bridge 10 between a set of three separate a-c power conductors 11A, 11B, and 11C and a set of two d-c power conductors 12P and 12N. The a-c conductors are in turn connected to a set 13 of star-connected secondary windings of a main power transformer 14 whose 3-phase primary 15 is adapted to be connected to the respective phases of a polyphase a-c electric power network (not shown) whose phase rotation is A, B, C. The bridge 10 has a nominal positive terminal 10p which is connected to the first d-c conductor 12P by way of a conventional current smoothing reactor or choke 16, and a nominal negative terminal 10n which is connected to the other d-c conductor 12N either directly or, more commonly, via the d-c terminals of at least one additional 6-pulse bridge connected in series with the bridge 10. In FIG. 1 the block 17 represents the companion bridges, and it will be understood that their a-c terminals are ordinarily connected to separate power transformers or to additional sets of 3-phase secondary windings inductively coupled to the primary 15 of the illustrated transformer 14. To form a 12-pulse converter, for example, a total of two bridges and two sets of secondary windings can be used, with the second set having its windings connected in delta so that its voltages are displaced in phase by 30 electrical degrees from the voltages on conductors 11A, 11B, and 11C, respectively.

The converter that is shown in FIG. 1 is intended to be part of one pole of a terminal or station of a power delivery system which can transmit high voltage direct current (HVDC) over the conductors 12P and 12N between the a-c network to which the transformer primary 15 is connected and another network to which the remote ends of these d-c conductors are coupled. Ordinarily there is another converter terminal (not shown) located between the remote end of the d-c link and the other a-c network. In this setting each of the six controlled valves in each bridge of the system must necessarily be capable of periodically blocking high voltages and conducting high currents. Toward that end, each valve preferably comprises a series string of parallel arrays of individual thyristors which are suitably arranged for switching and conducting effectively in unison. See for example U.S. Pat. No. 3,423,664-Dewey. Each of the constituent thyristors of a valve has its own gating means, and in order to turn on or to fire the valve suitable means is provided for simultaneously activating the gating means of all of its thyristors in response to a trigger signal being applied to the valve by associated controls.

The firing means for the valves of bridge 10 includes a valve firing system 20 which repetitively produces a series of appropriate trigger signals 21–26 and which sequentially applies these signals to the six valves 1–6 in numbered order. In FIG. 1 the valve firing system 20 is illustrated as a single block that is intended also to include a firing signal logic function. The valve firing system 20 is suitably designed to produce the trigger signals 21–26 in turn when activated by periodic output signals of a firing time computer 28. The firing time computer 28, during each cycle of the transformer secondary voltages, generates and distributes to the valve firing system a family of six staggered output pulses 31–36 (herein referred to as firing signals). The individual firing signals respectively commence at intervals of 60 electrical degrees, and it is their timing relative to the zero crossings of the alternating voltages on the conductors 11A, 11B, and 11C that determines the firing angle of the valves 1–6. By varying this firing angle, the direction and amount of power flowing between the a-c and the d-c conductors can be controlled in a known manner.

The firing time computer 28 is suitably constructed and arranged to vary, within prescribed limits, the timing of the family of firing signals relative to the zero crossings of the alternating voltages so that the actual direction and quantity of power will conform to a given power order. Toward this end, operation of the firing time computer 28 is affected by several interdependent inputs. As is shown in FIG. 1, one of the inputs is a periodic feedback signal $\theta_c$ which marks the initiation of successive valve firings in the bridge 10. Another input is a periodic reference signal $\theta_s$ which is synchronized with the fundamental sinusoidal voltage waveform of the power system. This reference signal is derived from the a-c network by means of an a-c system monitor 40 which is coupled to the power conductors 11A, 11B and 11C by suitable means such as tertiary windings 41 of the main 3-phase power transformer 14. Other inputs to the firing time computer are supplied by a block 42 labeled "run limits" and by a regulator 80 which in turn receives power orders from the master controls 43 and system responses from a feedback terminal 47. It should be noted that in a 12-pulse converter the companion bridge 17 can either share the same firing time computer with the bridge 10 (as is further explained below) or have its own separate controls, in which case the firing time computers associated with the two bridges could be suitably arranged to operate either independently or in concert with one another.

Timing of the start of each of the firing signals 31–36, relative to a cyclically recurring reference point which is the negative-going zero crossing of the corresponding valve voltage, is characterized by the electrical angle $\beta$. Under steady state conditions the frequency of the firing signals corresponds to the fundamental frequency of the power system (e.g., 60 Hz), and the magnitude of $\beta$ is constant. By transiently raising or lowering the firing signal frequency relative to the system frequency, $\beta$ can be advanced or retarded at a rate that depends on the amount of frequency difference.

More details of the firing time computer 28 will now be described with reference to FIG. 2 which schematically illustrates a preferred embodiment of my invention. As can be seen in FIG. 2, the firing time computer comprises a signal generator 50 which is controlled by a variable bipolar control signal $F_\epsilon$, and means 60 for deriving the control signal from a bipolar input signal 61 whose source is the regulator 80. The regulator varies the input signal 61 in accordance with the difference between actual and desired magnitudes of a selected system quantity.

The signal generator 50 comprises the combination 51 of a voltage controlled oscillator and a distributor. The voltage controlled oscillator in turn comprises a frequency modulated clock whose operating frequency varies with the magnitude of a frequency determining voltage $F_c$, and means 53 is provided for deriving $F_c$ from the algebraic sum of the control signal $F_\epsilon$ and a bias signal $F_b$ of preselected magnitude. The oscillator has an integrating characteristic; the time interval that it requires after being periodically recycled before producing its next output pulse is determined by the magnitude of $F_c$. The bias signal $F_b$, which is taken from a terminal 54, is appropriately dimensioned to cause the voltage $F_c$ to have the proper magnitude whenever the control signal is zero to cause the oscillator to run at a predetermined harmonic (e.g., 12th) of the normal fundamental frequency (e.g., 60 Hz) of the alternating voltage of the a-c network. Thus in steady state operation the oscillator produces a train of equidistant, discrete pulses whose frequency is a predetermined multiple of the a-c system frequency.

In the signal generator 50 the distributor responds to alternate pulses in the oscillator pulse train by sequentially issuing at 60-degree intervals the periodic firing signals 31–36 which activate in turn the previously described valve firing system 20. Interleaved with the signals 31–36 are six more firing signals belonging to a second family that the distributor generates for firing the valves of the companion bridge 17 in a 12-pulse converter. Each of the firing signals is a square-wave pulse of 180° duration. Concurrently with the commencement of each firing signal, the clock in the voltage-controlled oscillator is reset or cleared, and the oscillator immediately starts its next cycle of operation. Sixty degrees after initiating the sixth firing signal 36, the distributor repeats the first firing signal 31. In this manner the firing signal for each valve in the bridge 10 is cyclically generated at a frequency determined by the magnitude of $F_c$.

Suitable means 55 for initially synchronizing the signal generator 50 is associated therewith. In the signal generator, the frequency modulated clock of the voltage-controlled oscillator comprises an integrator and a level detector. The integrator produces an output signal which increases at a rate proportional to $F_c$, and each time it attains a predetermined threshold level the level detector produces a discrete output pulse. In response to this pulse, the distributor produces the individual firing signal that is then due, and concurrently the oscillator is recycled by reset means which abruptly reduces the integrator output signal to zero. Thus the integrator output signal has a saw tooth waveform. It should be noted that the instantaneous magnitude of this waveform is an electrical analog of the angle of the rotating phasors that respectively characterize successive valve firings with respect to a fixed ray, and (except during reset) the instantaneous slope of the waveform is a measure of the angular velocity (frequency) of the corresponding phasor. Therefore the angular velocity of the valve firing phasors is proportional to $F_c$.

When the fundamental frequency of the system voltage is normal and $F_\epsilon$ is zero, $F_c$ will equal $F_b$ so that the signal generator 50 runs at a "normal" frequency and the angle $\beta$ of the firing signals remains constant. If $F_\epsilon$ has a finite positive magnitude, $F_c$ increases by that magnitude and proportionately increases the oscillator frequency above normal. Since the spacing between leading edges of consecutive firing signals is now shorter than 60° (system basis), $\beta$ is incrementally advanced each cycle of the higher frequency. Conversely, if $F_\epsilon$ has a finite negative magnitude, $F_c$ decreases and proportionately reduces the frequency below normal which incrementally retards $\beta$ each cycle of the lower frequency. The longer the oscillator runs at a given higher or lower frequency, or the greater the frequency deviation for a given length of time, the greater is the cumulative change of $\beta$.

For reasons more fully explained in my companion application (Ser. No. 382,015), the control signal $F_\epsilon$ for the signal generator 50 is derived from the input signal 61 by means 60 which comprises a beta monitor 62 for producing an angle feedback signal 63 whose magnitude is representative of $\beta$, an overriding clamp 64 for comparing the angle feedback signal 63 with preset minimum and maximum limits 65 and 66, respectively, and for supplying a limit signal 67 proportional in magnitude to the amount of any deviation of $\beta$ outside a range of permissible variations that these limits establish, and means 68 for algebraically summing the input signal 61 and the limit signal 67. The output of the summing means 68 is connected to a non-inverting, unity gain amplifier 69 whose output is representative of the sum of the signals 61 and 67 and is the control signal $F_\epsilon$.

The clamp 64 will influence the control signal $F_\epsilon$ as a function of any deviation of the angle feedback signal 63 beyond the respective minimum and maximum limits 65 and 66, and as a result the frequency of the signal generator 50 is varied as necessary to minimize the excursion of $\beta$ outside its permissible range (e.g., 18° to 173°). For example, if $\beta$ were too low the resulting positive limit signal 67 would proportionately increase the control signal by the proper amount to momentarily accelerate the signal generator so that it will correctly advance the generation of the next firing signal. Whenever the feedback signal 63 returns in-range, the limit signal returns to zero and no longer modifies the control signal. The present maximum and minimum limits of $\beta$ are determined by the external run limits 42, and they may be varied or adjusted under certain system conditions.

In accordance with the teachings of my companion application, the preset maximum limit 66 is also supplied to the regulator 80 where it establishes a reference or order to which the actual value of $\beta$ is regulated. For this purpose the regulator also receives a feedback signal 94 which corresponds to the angle feedback signal 63 produced by the beta monitor 62 in the firing time computer 28 or, in a case where duplicate beta monitors are provided (as in some 12-pulse converters), which has a typical value determined by a beta selector 95 from among the signal 63 and any other angle feedback signals 96 produced by the other monitors. When this mode of regulation is in effect, the magnitude and the relative polarity of the input signal 61 will depend on the deviation, if any, between the actual value of a valve firing angle and the maximum limit thereof. Alternatively, the constant value to which $\beta$ is regulated can be established by the preset minimum limit thereof. In other regulating modes, the input signal 61 is determined by an error signal which reflects the difference between orders from the master controls 43 and responses which are fed back to the terminal 47 from the converter itself and/or from the power system.

In any case, the control signal $F_\epsilon$ responds to changes in the input signal 61 by transiently increasing or decreasing $F_c$ and consequently the frequency of the signal generator 50 so as to advance or to retard the firing angle to a correct value that brings the actual magnitude of the selected quantity into agreement with the desired magnitude and thus reduces the error therebetween to zero. As is also taught in my companion application, the normal magnitude of the frequency determining voltage $F_c$ is arranged to track the fundamental frequency of the alternating voltage of the a-c power system, thereby changing the frequency of the signal generator 50 as necessary to keep the firing signals 31–36 synchronized with system voltage in the event the frequency of the latter changes. Preferably this is done in the regulator 80 by an automatic bias circuit that adds to the error signal a compensating signal which is a long time integral of the error.

The magnitude of the angle feedback signal 63 that is produced by the beta monitor 62 shown in FIG. 2 is a continuous and accurate representation, during all steadystate and transient conditions of the firing time computer, of the actual value of the angular displacement between the valve firing phasors and the rotating phasors that respectively characterize successive phase-to-phase voltages of the polyphase a-c system. (Such angular displacement is herein referred to as the phasor displacement angle.) To obtain this signal in accordance with my present invention, the monitor 62 comprises two measuring circuits. The first one includes an integrator 70 the input to which is a bipolar signal 71 whose magnitude depends on the difference, if any, between the frequency determining voltage $F_c$ and a voltage $F_s$ derived from the cyclic reference signal $\theta_s$ and directly proportional to its frequency. The latter frequency is the same as the fundamental frequency of the a-c power system.

The frequency feedback voltage $F_s$ is produced by a suitable frequency transducer 75 (which will be further described below) and is scaled similarly to $F_c$. Since the magnitude of $F_s$ is proportional to the angular velocity (frequency) of the a-c system voltage phasors, and $F_c$ is proportional to the frequency of the valve firing phasors, it will be understood that the resultant signal 71, which is representative of the instantaneous frequency error between the converter valve firings and the a-c system voltage, is proportional to the rate of change of the displacement angle between the respective rotating phasor systems. It follows that the time integral of the frequency error, and consequently the output of the integrator 70, is proportional to the instantaneous value of the phasor displacement angle. The value of this angle at the instant a firing signal is generated is the firing angle $\beta$ of that signal as hereinbefore defined. The integrator 70 is designed to have an integrating characteristic closely matching that of the voltage-controlled oscillator in the signal generator 50, and it also has a polarity inverting characteristic. Thus the output signal that it produces, namely the angle feedback signal 63, has a relatively negative polarity and a magnitude that is the desired fast responding analog representation of $\beta$. This signal is continuously representative of the phasor displacement angle, even during the intervals between valve firings, and since it is used in the overriding clamp 64, the action of that clamp limits the angular displacement between the two rotating phasor systems. In so doing $\beta$ is also limited.

So long as the frequency error is zero, the phasor displacement angle is constant, and so is $\beta$. Whenever there is a postive frequency error signal 71 (indicating that $F_c$ is higher than $F_s$), the magnitude of the angle feedback signal 63 is increasing at a rate of change which depends on the size of the error and which therefore is the same as the rate at which the phasor displacement angle is increasing. The amount that the angle feedback signal increases is a function of the time integral of the frequency error signal 71. In effect the integrator 70 tracks the oscillator 51, and consequently the magnitude of the angle feedback signal 63 varies with the predicted magnitude of $\beta$ for each consecutive firing signal that will in turn effect the next valve firing in numerical sequence. If the frequency error signal 71 were negative (indicating that $F_c$ is lower than $F_s$), the magnitude of the angle feedback signal 63 will decrease at the same rate as the phasor displacement angle and will thus continuously represent the computed value of $\beta$. When the error signal 71 is zero, the angle feedback signal 63 remains at a constant magnitude indicative of the then constant value of $\beta$.

In the preferred embodiment of my invention, the frequency error signal 71 comprises the sum of the control signal $F_\epsilon$ which is supplied to the signal generator 50 and a signal 72 which is proportional to the amount, if any, by which the system frequency feedback voltage $F_s$ differs from the preselected level of the bias signal $F_b$. The signal 72 is derived from comparing means 73 to which are supplied the bias signal $F_b$ from a terminal 74 (which can be the same as terminal 54) and the frequency feedback voltage $F_s$ from the frequency transducer 75. The frequency transducer 75 in turn is supplied with the periodic reference signal $\theta_s$, and it is suitably constructed and arranged to produce an analog representation of the fundamental frequency of the a-c system. Parameters are appropriately chosen so that when the actual frequency of the system coincides with the normal frequency thereof (e.g., 60 Hz), $F_s = F_b$ and the difference signal 72 is zero. Thus the magnitude of the latter signal 72 depends on the amount of difference between the actual system frequency and the normal fundamental frequency.

Preferably the frequency transducer 75 comprises an electronic tachometer whose output has both low ripple and fast response so that it accurately tracks changes in the frequency of $\theta_s$ during system disturbances. One suitable form of such a tachometer would comprise a monostable pulse generator which is triggered once each cycle of the a-c system voltage to produce a discrete pulse having a constant volt-second area, an integrator having a relatively short time constant for averaging the value of the train of discrete pulses that the pulse generator produces during successive cycles, and a sample-hold type of circuit which operates in synchronism with the pulse generator to briefly sample the instantaneous value of the integrator output and which holds the sampled value throughout the remainder of each cycle. By feeding back the sampled output value to the input of the integrator, the average value of the integrator output is forced to equal the average value of the pulse train. In steady state such a tachometer has a virtually ripple-free output whose magnitude depends on the fundamental frequency of the a-c power system; when the system frequency is changing, its output resembles a staircase. Alternatively, a digital frequency transducer could be used, in which event the time period of the alternating voltage waveform would be measured, the reciprocal of that measurement would be calculated by digital techniques, and the resulting binary indication of frequency would be converted to its analog equivalent by conventional digital-to-analog conversion techniques.

In practice the output from the tachometer 75 and the input to the oscillator 51 may be slightly offset compared to ideal, and the integrator 70 may have a long-term tendency to drift. Such imperfections are canceled out and nullified in the illustrated embodiment of the beta monitor 62 by an angle error loop 82 which exerts a corrective influence on the frequency error signal 71 as a function of any difference between the angle feedback signal 63 and another angle feedback signal 83 which is independently measured by the second angle measuring circuit of the beta monitor 62. The magnitude of the second angle feedback signal 83 is proportional to the average magnitude of $\beta$ over one full cycle of the power system voltage.

The second angle measuring circuit comprises a phase detector 84 which is suitably constructed and arranged to provide an output signal 83 whose magnitude is proportional to the duration of overlap between a valve firing signal and the positive half cycle of the corresponding phase-to-phase voltage of the a-c system. Toward this end the phase detector is supplied with the cyclic reference signal $\theta_s$ and with the periodic feedback signal $\theta_c$. The reference signal $\theta_s$ coincides with the positive half cycle of the phase A to phase C voltage of the a-c system and is thus in phase with the forward anode voltage across valve 1 prior to its firing (which voltage is also known as the commutating voltage of valve 5). The feedback signal $\theta_c$ coincides with the firing signal 31 for valve 1. The length of time that $\theta_s$ and $\theta_c$ coincide or overlap with one another is a measure of $\beta$, and an analog representation thereof can be obtained by using conventional logic and integrating circuitry.

Preferably the phase detector 84 is supplied with an array of six cyclic reference signals and an array of six firing signal feedback signals respectively corresponding to the six valves of the associated bridge, and it is designed to combine and to filter the six separate overlap measurements per cycle so as to produce a relatively smooth output signal 83 whose magnitude depends on their average value ($\beta_{av}$). With such a design the effect of extra zero crossings of system voltages arising from severe harmonic distortions tends to be averaged out. The second angle feedback signal 83 is therefore a very accurate and stable after-the-fact measure of the actual value of $\beta$.

The $\beta_{av}$ signal 83 is compared with the $-\beta$ signal 63 at a summing point 85. Preferably the negative angle feedback signal 63 is fed to the summing point 85 by way of a path that includes a lag circuit 86 whose time constant matches the time constant of the phase detector 84. The summing point 85 therefore develops a bipolar angle error signal 87 proportional to the difference, if any, between the predicted and the average magnitudes of $\beta$, and this angle error signal 89 is supplied to an integrator 88. The output of the integrator 88 is a slowly changing bias signal 89 which represents the negative time integral of the angle error signal 87, and as can be seen in FIG. 2 it is fed back to the input of the integrator 70 along with the previously described control signal $F_c$ and difference signal 72. The bias signal 89 modifies the frequency error signal 71 in a sense that forces the time average magnitude of the first angle feedback signal 63 to conform to $\beta_{av}$, whereby the steady-state angle error (87) is reduced to zero.

While I have shown and described a preferred form of my invention by way of illustration, further modifications will occur to those skilled in the art. I therefore contemplate by the claims which conclude this specification to cover all such modifications as fall within the true spirit and scope of my invention.

What I claim as new and desire to secure by United States Letters Patent is:

1. In an electric power delivery system comprising a plurality of controllable electric valves connected between two sets of power conductors, at least one of said sets being associated with a polyphase alternating voltage network, said valves being cyclically fired in a predetermined sequence and at firing angles which can be varied to control the flow of power between said sets of conductors, improved means for continuously monitoring said firing angles comprising:

a. a source of a variable bipolar control signal;
   b. means responsive to said control signal for producing during each cycle of alternating voltage a family of periodic output signals whose timing, relative to recurrent reference points in said cycle, is characterized by a variable electrical angle beta ($\beta$), said output signal producing means being so constructed and arranged that when said control signal is zero and said alternating voltage has a predetermined fundamental frequency the magnitude of $\beta$ is constant and when said control signal has a finite magnitude and said alternating voltage has said predetermined fundamental frequency the magnitude of $\beta$ is changing at a rate that depends on the control signal magnitude and in a sense that depends on its polarity;
   c. means activated by the respective output signals of said family for firing said valves in sequence;
   d. means responsive to any difference between said predetermined fundamental frequency and the actual fundamental frequency of said alternating voltage for deriving a first signal which depends on the amount of such difference;
   e. means for summing said control signal and said first signal; and
   f. means for integrating the sum of said control signal and said first signal to produce an angle feedback signal which is the time integral of said sum, whereby the magnitude of said angle feedback signal varies with the predicted magnitude of $\beta$ for each consecutive output signal that will in turn cause the next valve firing in said sequence.

2. The improved monitoring means of claim 1 in which said first signal deriving means comprises frequency transducer means coupled to said one set of conductors for producing a frequency feedback signal whose magnitude is proportional to the actual fundamental frequency of said alternating voltage and is equal to a predetermined level whenever said alternating voltage has said predetermined fundamental frequency, and means for comparing the magnitude of said frequency feedback signal with said predetermined level, said first signal being taken from said comparing means and having a magnitude proportional to the amount by which the magnitude of said frequency feedback signal differs from said predetermined level.

3. The improved monitoring means of claim 1 further comprising:

d. means for producing an additional angle feedback signal whose magnitude is proportional to the average magnitude of $\beta$ over a cycle of said alternating voltage;
   e. means for deriving an angle error signal which depends on the magnitude difference between the first-mentioned angle feedback signal and said additional angle feedback signal; and
   f. means for modifying the magnitude of the sum of said first signal and said control signal as a function of said angle error signal, whereby the average magnitude of said first-mentioned angle feedback signal is kept in agreement with the average magnitude of said additional angle feedback signal.

4. In an electric power delivery system comprising a plurality of controllable electric valves connected between two sets of power conductors, at least one of said sets being associated with a polyphase alternating voltage network, and means for cyclically firing said valves in a predetermined sequence and at a frequency that can be varied relative to the frequency of said alternating voltage in order to vary the firing angle of the respective valve firings, said firing means including means for varying the frequency of the valve firings in accordance with the magnitude of a frequency determining signal whose normal magnitude keeps the valve firings synchronized with said alternating voltage and means for transiently increasing or decreasing the magnitude of said frequency determining signal to advance or to retard the firing angle as desired, improved means for continuously monitoring said firing angle comprising:

a. first means coupled to said network for producing a frequency feedback signal whose magnitude is proportional to the frequency of said alternating voltage and is equal to the normal magnitude of said frequency determining signal so long as said firing angle is constant;

b. second means for deriving a frequency error signal which depends on the magnitude difference between said frequency determining signal and said frequency feedback signal; and c. third means for integrating said frequency error signal to produce an angle feedback signal which is the time integral of said frequency error signal, whereby said angle feedback signal continuously tracks any changes in firing angle resulting from variations in either the magnitude of said frequency determining signal or the frequency of said alternating voltage.

5. The improved monitoring means of claim 4 wherein said frequency determining signal is derived from the algebraic sum of a variable bipolar control signal and a bias signal which is effective when said control signal is zero to cause said frequency determining signal to have its normal magnitude.

6. The improved monitoring means of claim 4 further comprising:

d. fourth means coupled to said firing means and to said network for producing another angle feedback signal which is proportional to the average firing angle of the valve firings during a full cycle of operation;

e. fifth means for deriving an angle error signal which depends on the magnitude difference between said first-mentioned angle feedback signal and said other angle feedback signal; and f. sixth means for modifying the magnitude of said frequency error signal as a function of said angle error signal, whereby the time average magnitude of said first-mentioned angle feedback signal is kept in agreement with the average magnitude of said other angle feedback signal.

7. The improved firing angle monitoring means of claim 6 in which said second and sixth means are so arranged that the time integral of said angle error signal is added to said frequency error signal.

8. The improved firing angle monitoring means of claim 6 in which said fifth means includes a lag circuit in the path of said first-mentioned angle feedback signal, said lag circuit having a time constant that matches the time constant of said fourth means.

9. In combination:

a. means for providing a bipolar control signal of variable magnitude;

b. means for providing a cyclic reference signal of variable frequency;

c. means responsive to said control signal for producing a periodic output signal whose timing, relative to a predetermined recurrent reference point in each cycle of said reference signal, is characterized by a variable electrical angle beta ($\beta$), said output signal producing means being so constructed and arranged that when said control signal is zero and said reference signal has a predetermined frequency the magnitude of $\beta$ is constant and when said control signal has a finite magnitude and said reference signal has said predetermined frequency the magnitude of $\beta$ is changing at a rate that depends on the control signal magnitude and in a sense that depends on its polarity; and d. means for continuously monitoring $\beta$ comprising:

i. means responsive to any difference between said predetermined frequency and the actual frequency of said reference signal for deriving a first signal which depends on the amount of such difference, ii. means for summing said control signal and said first signal, and iii. means for integrating the sum of said control signal and said first signal to produce an angle feedback signal which is the time integral of said sum, whereby the magnitude of said angle feedback signal varies with the predicted magnitude of $\beta$ for each succeeding output signal.

10. The combination of claim 9 further comprising:

iv. means responsive to said reference and output signals for producing another angle feedback signal which varies with the actual magnitude of $\beta$, v. means for deriving an angle error signal which depends on the magnitude difference between said first-mentioned angle feedback signal and said other angle feedback signal, and vi. means for modifying the magnitude of said frequency error signal as a function of said angle error signal so as to keep the time average magnitude of said first-mentioned angle feedback signal in agreement with the average magnitude of said other angle feedback signal.

11. In combination:

a. means for providing a bipolar control signal of variable magnitude;

b. means for providing a cyclic reference signal of variable frequency;

c. means responsive to said control signal for producing a periodic output signal whose timing, relative to a predetermined recurrent reference point in each cycle of said reference signal, is characterized by a variable electrical angle beta ($\beta$), said output signal producing means including i. means for varying the frequency of said output signal in accordance with the magnitude of a frequency determining signal whose normal magnitude causes the output signal frequency to correspond to the reference signal frequency, in which event the magnitude of $\beta$ is constant, and ii. means for increasing or decreasing the magnitude of said frequency determining signal according to the value of said control signal, thereby respectively advancing or retarding $\beta$ at a rate that depends on the frequency difference between said reference and output signals; and d. means for continuously monitoring $\beta$ comprising:

i. first means for producing a frequency feedback signal whose magnitude is proportional to the frequency of said reference signal and is equal to the normal magnitude of said frequency determining signal whenever $\beta$ is constant, ii. second means for deriving a frequency error signal which depends on the magnitude difference between said frequency determining signal and said frequency feedback signal, and iii. third means for integrating said frequency error signal to produce an angle feedback signal which is the time integral of said frequency error signal, whereby said angle feedback signal continuously tracks any changes in $\beta$ resulting from variations in either the magnitude of said frequency determining signal or the frequency of said reference signal.

12. The combination of claim 11 wherein said frequency determining signal is derived from the algebraic sum of said control signal and a bias signal which is effective when said control signal is zero to cause said frequency determining signal to have its normal magnitude.

13. The combination of claim 11 further comprising:
iv. fourth means responsive to said reference and output signals for producing another angle feedback signal which is proportional to the average magnitude of $\beta$,
v. fifth means for deriving an angle error signal which depends on the magnitude difference between said first-mentioned angle feedback signal and said other angle feedback signal, and
vi. means for modifying the magnitude of said frequency error signal as a function of said angle error signal so as to keep the time average magnitude of said first-mentioned angle feedback signal in agreement with the magnitude of said other angle feedback signal.

* * * * *